(12) United States Patent
Smith et al.

(10) Patent No.: X8660
(45) Date of Patent: Feb. 25, 1835

(54) SHOVEL, SCOOP

(76) Inventors: John Smith; William Smith

The Schedule referred to in these letters Patent and making part of the same, containing a description in the words of the said John Smith & William Smith, themselves, of their improvement in the article of Scoop Shovels, and in the machinery for the manufacture of the same.

---

To all to whom these presents shall come.

---

Be it known that We, John Smith & William Smith of Williamstown in the County of Berkshire, and State of Massachusetts, have invented a new and useful improvement in the article of Scoop Shovels, and in the machinery for the manufacture of the same, and that the following is a full & exact description of the Shovel, and of the construction & operation of the Machinery for manufacturing it.

The blade or scoop of the shovel is made of sheet iron which after being cut to the requisite shape & size, is subjected, while in a heated state (usually heated, though not necessarily & invariably so) to the operation of the Engine (a description of which will be found below) which gives it the desired form.

In order to acquire the circular or spherical form the more conveniently, a triangular piece is taken out of that end of the pattern, which by contracting allows it to assume that form, without essentially straining the metal. When completed the blade or scoop of the shovel, as we now design to make it, is about sixteen inches in length at the top. The greatest breadth is about eleven & a half, and the greatest depth three & a half inches. The size & form may however be varied from the above dimensions, at pleasure. The handle is like that of the common gravel shovel, being bent, however in such form as to give the shovel a proper pitch, and is attached to the shovel in a similar manner, by two straps which being rivetted to the blade, serve also to cover the opening made by taking out the triangular piece before moulding, and also to strengthen the shovel. The iron used may be of sufficient thickness, to retain its form, without support, or it may be thinner, and be supported, or strengthened by wiring the top & heming the end.

The Engine for forming the shovel as mentioned above, consists of a bed piece of cast iron hollowed out to the proper form, and a moveable die also of cast iron the lower surface of which is made to correspond with the cavity in the bed piece which by being raised to a sufficient height and suffered to fall upon the sheet metal lying upon the bed-piece forces it into the cavity, and gives it, by a single stroke, the desired form. The moveable die is governed and made to rise and fall perpendicularly, by two perpendicular ribs, or ways which fit into grooves in the sides of the die on the same principle as the pile engine, and is raised in a similar manner, the hook being made to engage & disengage itself as in that case, as will be seen by the model,– and we conclude that this kind of machinery is so simple in itself and so well known as to render a further description unnecessary.

The sheet is cut into form by means of two revolving cutters of a proper size, say from two to four inches in diameter, the edges of which are made to run in close contact with each other like the blades of shears. The cutters are firmly attached to the ends of two shafts which are geared together to secure a uniform motion, & in the right direction. The fixtures for the shafts consist of a bed-plank of oak or other hard timber about four feet long, two feet wide, & two or three inches thick. A stud or post about one foot six inches high is framed into the bed-plank, three inches from the end which supports the back end of both the shafts. The other end of the lower shaft is sup-
ported by a pillow, or bearings placed upon the bed-plank near
the cutter- while the end of the upper shaft is supported by an
arm extending from the stud or post above the shaft nearly to
the cutter, which leaves the space between the shafts entirely clear,
so as to permit the sheet to pass freely between them (see model).
The cutters are kept in close contact by means of a stand—
placed at the back end of the upper shaft which prevents it
vibrating in that direction and a screw at the opposite end of
the lower shaft. A spiral spring occupies the space between
the stud or post, and the gearing upon the upper shaft, which
prevents it from vibrating in the opposite direction, and another
spring is thrown around the lower shaft upon the other side
of the stud, to hold it against the point of the screw at the end,
and thus both shafts are prevented from vibrating in either
direction (see model). This distance which the edges of the
cutters are made to pass each other, is regulated by means of
a screw directly over the journal of the upper shaft, and two
spiral springs around the pins which hold the cap below the
shaft (see model) By means of this apparatus the cutters may be
entirely separated, and brought in contact again at pleasure, so as to
commence cutting at any point in the middle of the sheet if desirable.
For cutting in a right line the sheet is placed upon a carriage which
extends from the cutters to the end of the bed plank, and is elevated so
as to bring the sheet exactly on a level with the point of contact of the
cutters. The carriage is made to pass the cutters in a right line, by
means of two lips, one upon each side of it, which fit closely to the
sides of the projection, or elevation of the bed-plank upon which it
lies (see model). But for cutting the shovel patterns into form, this
carriage is removed, and another placed in its stead, which has two
pins projecting from its lower surface, one of which is placed near
the forward end, on a line with the centre of the pattern, and the other a little back of the centre of the carriage, at a point corresponding, with the centre from which the arc of a circle which forms either side of the back end of the pattern is described (see model). Two grooves are cut in the elevation of the bed plank, to receive these pins in such form that the carriage when moved forward, proceeds in a right line as far as necessary (about two inches) when the centre pin strikes a stop and the carriage turns upon it, as upon a pivot – the groove for the forward pin from the point being circular, the carriage continues to turn in this manner, till the whole width of the sheet has been presented to the cutters, when it is drawn back, the sheet turned over, and the motion repeated to cut the other side of the pattern. Before placing the sheet upon the carriage a line is struck at right angles with the edge, for the centre of the pattern: it is then placed upon the carriage in-such a manner as to bring the centre line directly over a corresponding one on the carriage, and the edge of the sheet is brought against a lip projecting from the upper surface at the forward end, and in this situation it is confined by a dog, or hold fast, which strikes upon the centre of the sheet. The carriage is then made to pass the cutters, as described above which cuts one side of the pattern to its proper form: the sheet is then turned over and the centre lines being made to agree as before, the other side is cut; and thus a perfect symmetry in the two sides is secured and a perfect uniformity in any number of patterns required without laying out. The sheers may be propelled by steam, water, or other power, the power being first communicated to the lower shaft, and from that to the other, by gearing.

The other apparatus used consists of swedges or moulds for forming the pads or straps, and a lever or screw press for punching the holes for riveting &c, all of which are constructed upon principles familiarly understood and extensively employed.

What we claim as original is a sheet iron Scoop shovel with a circular or spherical end moulded into form without cutting the sides _ Also the rotary shears, in their
adaptation to the manufacture of shovels and in their application
to general purposes. Also the application of the principle of the
falling die, to the specific purpose of forming shovels.

In testimony that the above is a true specifi-
cation of our invention or improvement we have hereunto set our
hands this tenth day of December, in the year of our Lord one
thousand eight hundred and thirty four.

Witnesses
Dennis Smith
Eber Shearman

John Smith

William Smith

Exd
[illegible]

(Received & Recorded anew
[illegible] Mar. 1847)